United States Patent [19]

Davis

[11] 3,956,890

[45] May 18, 1976

[54] SOLID PROPELLANT BINDER AND PROPELLANT

[75] Inventor: Kenneth E. Davis, Taylor, Mich.

[73] Assignee: BASF Wyandotte Corporation, Wyandotte, Mich.

[22] Filed: Sept. 7, 1961

[21] Appl. No.: 136,677

[52] U.S. Cl................................ 60/219; 149/19.4; 149/76; 149/108.2
[51] Int. Cl.² ........................................ C06D 5/00
[58] Field of Search .................. 149/19, 44, 79, 83, 149/96–98; 60/35.4

[56] References Cited
UNITED STATES PATENTS
3,002,830   10/1961   Barr....................................... 149/19

OTHER PUBLICATIONS

Missiles & Rockets, Vol. 5, No. 18, May 4, 1959, p. 11.

Primary Examiner—Samuel Feinberg
Attorney, Agent, or Firm—Joseph D. Michaels; Bernhard R. Swick; Robert E. Dunn

EXEMPLARY CLAIM

1. A solid polyurethane propellant binder composition which comprises a polyurethane composition comprising the reaction product of nitrocellulose plasticized with a plasticizer selected from the group consisting of nitroglycerin and triethyleneglycol dinitrate, an aromatic diisocyanate and a polyol having a molecular weight of about 500 to 3,000 selected from the group consisting of dicarboxylic acid-polyol-polyesters and polyoxyalkylene ethers, and mixtures thereof, wherein said plasticizer is present in the proportion of about 40 to 60 parts by weight per 100 parts by weight of binder composition, wherein said nitrocellulose contains about 11.0 to 13.0% nitrogen and is present in the proportion of about 0.7 to 1.0 part per part of said polyol, and wherein said diisocyanate is present in an amount to provide an NCO/OH ratio of said diisocyanate to said polyol of about 1.2/1 to 3.0/1.

19 Claims, No Drawings

SOLID PROPELLANT BINDER AND PROPELLANT

This invention relates to solid propellants for rocket engines utilized to propel missiles and space vehicles. In one aspect it relates to a novel solid propellant binder composition. In another aspect this invention relates to a novel solid propellant composition incorporating a novel binder composition. In still another aspect this invention relates to a novel polyurethane composition.

Solid propellants are generally classified into two groups: homogeneous propellants and composite propellants. The homogeneous propellant class consists of gel type propellants of the single, double and triple base types, while the composite propellant class consists of propellants wherein solid oxidizers and other solid additives are dispersed within an organic binder such as polybutadiene-acrylic acid polymers, polysulfide polymer, polyester heteropolymerized with unsaturated olefins, and polyurethanes. In the composite type of propellants, the binder serves as an organic fuel and also contributes the mechanical properties to the propellant grain.

While ballistic properties of a propellant are very important the mechanical properties of the propellant grain are also extremely important. The propellant should have high tensile strength, high elongation, low shrinkage during curing, relatively high modulus, and good adhesiveness to the liner of the motor case. These properties are necessary to prevent appreciable deformations or disintegration of the propellant grain under the pressure gradients produced in the rocket motor by ignition and burning of the grain and by flight acceleration forces. Also the propellant grain must not sag during long periods of storage. To be suitable for military use the propallant must have these properties throughout the temperature range of −75° to 175°F.

The homogeneous propellants which are high performance propellants having high specific impulse values have mechanical properties which are susceptible to temperature changes. At high temperatures the grain becomes very pliable while at low temperatures the grain becomes very brittle. Thus the homogeneous type of propellants is unsuitable for use under certain temperature conditions.

Mechanical properties of the moderate performance composite type propellants are not affected to the same degree by temperature variations. However, to obtain the high performance in such propellants large quantities of solids must be incorporated into the binder material. The high solid content and low binder content result in a brittle propellant grain, particularly at low temperatures.

Therefore it is apparent from the foregoing that neither of the classes of solid propellants known in the art has both high performance and the necessary mechanical properties to provide a desirable high performance solid propellant.

Therefore an object of this invention is to provide a new and improved solid propellant binder composition.

Another object of this invention is to provide a double base elastomeric solid propellant binder composition which can be cast into a propellant grain.

A further object of this invention is to provide a new and improved solid propellant wherein the ingredients are incorporated into the matrices of the novel elastomeric binder.

Still another object is to provide a solid propellant having outstanding physical and ballistic properties at high and low temperatures.

A still further object is to provide a new method of developing thrust.

The above and other objects are accomplished by a solid polyurethane propellant binder composition which comprises a polyurethane composition. The polyurethane composition comprises the reaction product of nitrocellulose containing 11.0 to 13.0% nitrogen which has been plasticized with nitroglycerin or triethyleneglycol dinitrate, an aromatic diisocyanate, and a dicarboxylic acid-polyol-polyester or polyoxyalkylene ether polyol or a mixture thereof having a molecular weight of about 500 to 3,000. The nitrocellulose is present in the proportion of about 0.7 to 1.0 part per part of polyol and the aromatic diisocyanate is present in an amount to provide an NCO/OH ratio of the diisocyanate to the polyol of about 1.2/1 to 3.0/1.

The binder composition of this invention is the basis for a new class of propellants — cross-linked double base composite propellants. The binder is an elastomeric polyurethane composition wherein a polyol is cross-linked with nitrocellulose through urethane linkages provided by the aromatic diisocyanate and results in a polyurethane elastomer. Nitroglycerin or triethyleneglycol dinitrate which serves as a plasticizer is retained within the polyurethane matrix. The resulting elastomeric binder has outstanding retention characteristics for the plasticizer and energetic characteristics by virtue of nitrato substituents and with the incorporation of an inorganic oxidizing salt and an energetic powdered metal results in a solid propellant having outstanding mechanical and ballistic performance properties.

While polyurethane binders are known in the art none of those known have utilized a plasticized polyester (or polyether) polyurethane wherein nitrocellulose is the cross-linking agent to form the elastomer, thus forming a cross-linked double base binder having ballistic properties. The binder itself produces some thrust. Typical polyurethane binders and the other polymerized organic binders known in the art serve only as a fuel and have no ballistic properties, hence produce no thrust.

Propellants prepared with the binder of this invention have high tensile strength, high modulus, good adhesiveness and excellent thermal stability. The elastomeric nature prevents the development of cracks and internal imperfections which have an adverse effect upon the burning characteristics of the propellant and result in abortive launchings. The elastomeric properties also prevent sagging during prolonged storage and deformation and erosion during ignition and burning of the propellant grain and allow the propellant grain to withstand the high acceleration forces asserted on the grain during blast-off.

The elastomeric propellants of this invention have high theoretical specific impulse in the range of about 263 to 266 lbf-sec/lbm at 1,000 psi chamber pressure expanded to 14.7 psi and meet the temperature specifications required for military use. Thus the propellants are ballistically and mechanically stable after prolonged storage at temperatures from −75°F. to 175°F. The propellant compositions also have excellent thermal stability and good impact sensitivity characteristics which make them safe to handle and store.

Because of the excellent thermal properties both mechanical and ballistic imparted onto the propellants by the cross-linked double base polyurethane binders, the propellants are exceptionally suitable for use in areas of the earth or outer space having temperature extremes either hot or cold and would be especially useful for launchings from submarines.

The distinction between the propellant binders of this invention and those known in the art lies in the fact that by virtue of the double base system wherein one base serves as a plasticizer and the other base serves as a cross-linking agent in the polyurethane elastomeric binder, propellant compositions having high specific impulse values may be prepared using low quantities of solids. Thus the high binder content and low solids content permissible result in a propellant grain having excellent mechanical properties and at the same time having high performance. As already explained, to obtain the same specific impulse values in propellants utilizing conventional polyurethanes and other polymerizable binders an extremely high solids content is necessary which results in a very brittle propellant grain.

Another of the features of the propellant composition of this invention is the wide range over which the composition can be varied without significantly altering the ballistic performance capabilities. The performance remains essentially constant within the specific impulse range 263 to 266 lbf-sec/lbm over the entire composition range.

The polyurethane binder composition and solid propellant composition will be described in complete detail separately in the following.

BINDER COMPOSITION AND PROCESSING

The elastomeric polyurethane propellant binder of this invention comprises nitrocellulose, a plasticizer, an aromatic diisocyanate, and a polyol. After curing, the binder is an elastomeric mass formed by the polyol being cross-linked with nitrocellulose through urethane linkages supplied by the aromatic diisocyanate and has plasticizer distributed within the binder matrix.

Lacquer grade nitrocellulose is used as the cross-linking agent to form the elastomeric polyurethane binder and is present in the proportion of about 0.7 to 1.0 part per part of polyol. In order to be useful the nitrocellulose must have available hydroxyl groups to form urethane linkages with the organic diisocyanate. Thus the nitrocellulose cannot be fully nitrated. Nitrocellulose containing about 11.0 to 13.0% nitrogen is suitable for cross-linking and nitrocellulose containing about 11.8 to 12.2% nitrogen is especially useful. The nitrocellulose may be prepared for the binder by pulverizing the fibers to a fine free-flowing powder and subsequently drying the powder to a moisture content of about 0.3%. However, preferably for safety reasons, the fibers are pulverized and the water removed by rapidly stirring a suspension of nitrocellulose in methylene chloride and subsequently filtering and washing three times with methylene chloride. The nitrocellulose is used for the binder preparation in the methylene chloride-wet state.

The plasticizer serves to plasticize the nitrocellulose and the elastomeric polyurethane composition and constitutes about 40 to 60% by weight of the total binder weight. Plasticizers found suitable for the binder of this invention contain a large quantity of oxygen. Representative of the plasticizers are nitroglycerin and triethyleneglycol dinitrate. However, it should be noted that other plasticizers, such as triacetin, may be employed in the preparation of the polyurethane composition of this invention for nonpropellant applications. Nitroglycerin is especially useful as the plasticizer for propellant binder applications. The plasticizer preferably before use is dried over a molecular sieve.

The organic diisocyanates which can be employed in preparing the polyurethane compositions of this invention are the aromatic diisocyanates. Representative of the aromatic diisocyanates are tolylene-2,4-diisocyanate, tolylene-2,6-diisocyanate, m-phenylene diisocyanate, naphthylene-1,5-diisocyanate, 1-methoxyphenyl-2,4-diisocyanate, diphenylmethane-4,4'-diisocyanate, 4,4'-biphenylene diisocyanate and mixtures thereof. The organic diisocyanate must be present in sufficient quantity to effectuate cross-linking between the polyol and the nitrocellulose. Therefore the organic diisocyanate is employed in an amount sufficient to provide an NCO/(OH (polyol)) ratio of from about 1.2 to 3.0.

The polyol used in the polyurethane binder composition of this invention may be any of the polyesters or polyoxyalkylene ethers (polyethers) known in the art or mixtures thereof. However, the suitable polyols have a molecular weight of about 500 to 3,000 and preferably about 1700 to 2,000.

The polyesters useful in the compositions of this invention are prepared by the condensation reaction between one or more polyhydric alkanols or alkylene oxide adducts thereof and one or more dibasic carboxylic acids or anhydrides thereof. The ratio of polyhydric alkanol to dibasic carboxylic acid should be controlled so that there is an excess of hydroxyl groups. This is done in order to obtain polyester chains containing a preponderance of terminal hydroxyl groups. Polyesters having molecular weights from about 500 to 3,000 are effective and those having molecular weights from about 1700 to 2,000 are particularly effective in preparing the polyurethane propellant binder.

The polyhydric alkanols employed in the preparation of the polyesters contain about 2 to 6 hydroxyl groups and about 2 to 10 carbon atoms, for example, ethylene glycol, propylene glycol, diethylene glycol, butane-1,4-diol, pentane-1,5-diol, hexane-1,3-diol, hexane-1,6-diol, glycerol, 1,1,1-trimethylolpropane, 1,1,1-trimethylolethane, hexane-1,2,6-triol, pentaerythritol, and sorbitol. Alkylene oxide adducts of the polyhydric alkanols or polyether polyols, as they are commonly referred to, are the condensation products of a polyhydric alkanol and one or more alkylene oxide units having 2 to 4 carbon atoms such as ethylene oxide, propylene oxide, and butylene oxide. They are prepared by the addition or sequential addition of ethylene oxide, propylene oxide, butylene oxide or mixtures thereof to the polyhydric alkanol base. Typical polyether polyols include polyoxyethylene glycol, polyoxypropylene glycol, polyoxybutylene glycol, polytetramethylene glycol, polyoxypropylene adducts of hexane-1,3-diol, 1,1,1-trimethylolpropane and pentaerythritol, addition product of propylene glycol with mixture of ethylene oxide, propylene oxide and butylene oxide, and addition product of trimethylolpropane with ethylene oxide, then propylene oxide and then butylene oxide.

Any dibasic carboxylic acid or its anhydride can be used in the preparation of the polyesters. Representative examples are adipic, sebacic, malonic, suberic, succinic, maleic, fumaric, and itaconic acids and anhydrides.

The preferred polyesters are those prepared by reacting adipic acid with ethylene glycol, propylene glycol, diethylene glycol, polyethylene glycol, polypropylene glycol and/or butylene glycol, the glycols being used singly or in mixtures of two or more, to give polyesters having a molecular weight ranging from about 500 to 3,000 and preferably from about 1700 to 2,000.

The polyethers which may be employed to replace all or part of the polyester are those heretofore described for use in preparing polyesters and should have a molecular weight of about 500 to 3,000 and preferably about 1700 to 2,000. However, it should be noted that in cases where both a polyester and a polyether are employed in the preparation of the binder the concentration of each will depend on the solubility of each so that the formation of separate layers of polyester and polyether is prevented.

While the binder may be prepared without stabilizers or curing agents it is desirable to employ these compounds to obtain high stability and faster curing. Various compounds such as nitrodiphenylamine, diphenylamine or ethyl centralite may be added to the mixture for stabilization purposes to permit safe processing of the binder. Organometallic materials, such as stannous octoate or ferric acetyl acetonate, and tertiary amines, such as triethylenediamine, also may be added to increase the curing rate without departing from the scope of this invention.

The binder is prepared by first mixing the nitrocellulose, plasticizer, polyol, catalyst and stabilizer together until a homogeneous binder gel mixture or presolution is obtained. The gel at this point is just a mixture with no cross-linking having taken place. Organic diisocyanate is now added and the mass mixed under vacuum for about 0.5 hours at about 150° to 158°F. until a homogeneous mixture is obtained. The mix is cast into a mold or rocket motor and cured for about 11 days at 127°F.

The cured elastomeric polyurethane binder obtained is useful as a low thrust propellant. To prepare the high thrust propellants of this invention high energy metals and oxidants are added to the binder gel before the addition of organic diisocyanate after which the diisocyanate is added and the mixture cured. The preparation of high thrust propellants is described subsequently.

PROPELLANT COMPOSITION AND PROCESSING

While the cured polyurethane binder alone produces some thrust while burning, making it suitable for certain applications, additives are necessary to produce a solid propellant having high thrust or high specific impulse characteristics. Propellants incorporating the binder composition of this invention and oxidants have been prepared having high specific impulses of about 250 to 255 lbf-sec/lbm and comprise on the basis of the total weight of the propellant about 30 to 90% by weight of binder and about 10 to 70% by weight of an inorganic oxidizing salt. Higher specific impulses in the range of 263 to 266 lbf-sec/lbm are obtained when powdered metals in addition to oxidants are incorporated into the propellant. These propellants comprise on the basis of the total weight of the propellant about 20 to 65% by weight of binder, about 15 to 60% by weight of an inorganic oxidizing salt and about 10 to 30% by weight of a powdered metal having energetic properties. In these compositions the inorganic oxidizing salt and powdered metal are dispersed within the binder compositions previously described.

The inorganic oxidizing salts which are useful in the solid propellant composition of this invention are those oxygen-containing salts which readily give up oxygen. These include ammonium, alkali metal, and alkaline earth metal salts of nitric, perchloric, and chloric acids, and mixtures thereof. Representative of the oxidants are ammonium perchlorate, ammonium nitrate, sodium nitrate, potassium perchlorate, potassium chlorate, lithium perchlorate, lithium chlorate, calcium nitrate, calcium chlorate, barium perchlorate, strontium chlorate, and strontium perchlorate. Ammonium perchlorate has been found to be especially useful as an oxidant to produce a solid propellant having high thrust. The oxidants are preferably prepared for the propellant compositions by first drying the oxidant by conventional means to about 0.021% moisture and then blending pulverized and unpulverized oxidant together. A maximum particle size of 500 microns is desirable.

The powdered metals useful in the propellant compositions of this invention are those which are either high energy or high density fuels. Representative of the suitable powdered metals are aluminum, magnesium, titanium, zirconium, and boron. Alloys and mixtures of the aforesaid metals may also be employed. Aluminum is particularly suitable as a component of high thrust propellants. Preferably the powdered metal should have an average particle size of about 10 to 20 microns and be free of moisture.

Stabilizers such as magnesium oxide may be added to the propellant to prevent acidic decomposition products of the oxidants from effecting autocatalytic decomposition.

The propellant may be prepared by several procedures. However, preferably the propellant is prepared according to the following procedure. After the binder gel or presolution is prepared according to the procedure previously described, dried powdered metal is added thereto and the mass mixed until the metal particles are wetted. The dried inorganic oxidizing salt and any stabilizers are next added and the mixture is mixed under vacuum at about 100° to 150°F. for about 0.5–1.5 hours or until a homogeneous mixture is obtained. The aromatic diisocyanate is then added and the mixing continued for about 0.5 hour. The resulting mixture is cast into a suitable mold or rocket motor to form the propellant grain and cured. The grain is cured for several days at about 120° to 130°F. until a cured polyurethane elastomer is obtained.

Other stabilizers, wetting agents, curing agents, antioxidants, etc. to improve storability, castability, and curing time may be added without departing from the scope of the invention.

The following examples are presented to particularly illustrate the invention but should not be used to limit, unduly, the scope of the invention. In these examples the binder and propellant were prepared and cured in accordance with the following general procedure:

BINDER AND PROPELLANT PREPARATION

A suspension of nitrocellulose in methylene chloride was prepared and rapidly stirred for 0.5 hour, filtered and successively washed three times with methylene chloride to remove the water. A solution of nitroglycerin, polyol, and 2-nitrodiphenylamine was added dropwise with rapid stirring to the nitrocellulose filter cake wet with methylene chloride. The mixture was then slowly heated to 160°F., under vacuum, for about 5 hours to remove the methylene chloride and any remaining water. The resulting presolution had a moisture content of about 0.025%.

In the following examples, which illustrate the cured binder only, ferric acetylacetonate and tolylene-2,4-diisocyanate were added next to the presolution and the mass was mixed in a horizontal sigma-blade mixer for 0.5 hour under vacuum (2 mm Hg) at 140° to 145°F. The mix was then cast into a mold and cured at 120° to 130°F. until a cured polyurethane elastomer was obtained.

However, in the examples illustrating the solid propellant dried powdered aluminum was added to the presolution first and the mass mixed in a horizontal sigma-blade mixer until the aluminum particles were wetted. Ammonium perchlorate and magnesium oxide were then added and the mass was mixed under vacuum at about 140° to 145°F. for about 1.5 hours and then tolylene-2,4-diisocyanate and ferric acetylacetonate were added and the mixing continued for about 0.5 hour. The resulting mixture was cast into a mold or rocket motor and cured at 120° to 130°F. until a cured polyurethane elastomer was obtained.

EXAMPLE I

This example illustrates the cured binder, suitable for low thrust requirements, wherein a polyester was employed as the polyol.

| Ingredients | Weight % |
| --- | --- |
| Nitrocellulose[1] | 19.8 |
| Nitroglycerin | 49.5 |
| Polyglycol adipate[2] | 25.7 |
| Tolylene-2,4-diisocyanate | 4.0 |
| 2-Nitrodiphenylamine | 1.0 |
| Ferric acetylacetonate | 0.00004 |
| Nitrocellulose/polyol wt. ratio | 0.77 |
| NCO/OH (polyol) | 1.53 |
| Curing Time (days) | 11 |

[1] 18–25 Centipoise viscosity, 11.4% Nitrogen (Hercules R.S.).
[2] Polyethyleneglycol adipate, average mol. wt. 1700 (Rubber Corp. of America polyester F-1).

The cured binder composition was a yellow colored, pliable, rubbery solid that was not brittle.

EXAMPLE II

This example illustrates the cured binder wherein a mixture of a polyester and a polyether was employed as the polyol.

| Ingredients | Weight % |
| --- | --- |
| Nitrocellulose[1] | 24.8 |
| Nitroglycerin | 41.2 |
| Polyglycol adipate[2] | 21.6 |
| Polyoxypropylene glycol[3] | 6.5 |
| Tolylene-2,4-diisocyanate | 4.9 |
| 2-Nitrodiphenylamine | 1.0 |
| Ferric acetylacetonate | 0.00004 |
| Nitrocellulose/polyol wt. ratio | 0.87 |
| NCO/OH (polyol) ratio | 1.8 |
| Curing Time (days) | 11 |

[1] 18–25 Centipoise viscosity, 11.4% Nitrogen (Hercules R.S.).
[2] Polyethyleneglycol adipate, average mol. wt. 1700 (Rubber Corp. of America polyester F-1).
[3] Average mol weight 2,000.

The cured binder composition was a yellow colored, pliable, rubbery solid that was not brittle.

EXAMPLE III

This example illustrates the cured binder wherein a polyether was employed as the polyol.

| Ingredients | Weight % |
| --- | --- |
| Nitrocellulose[1] | 22.9 |
| Nitroglycerin | 41.5 |
| Polyoxyethylene glycol[2] | 30.1 |
| Tolylene-2,4-diisocyanate | 4.3 |
| 2-Nitrodiphenylamine | 1.2 |
| Ferric acetylacetonate | 0.00004 |
| Nitrocellulose/polyol wt. ratio | 0.76 |
| NCO/OH (polyol) ratio | 1.23 |
| Curing Time (days) | 13 |

[1] 18–25 Centipoise viscosity, 11.4% Nitrogen (Hercules R.S.).
[2] Average mol wt. 1500.

The cured binder composition was a yellow colored, pliable, rubbery solid that was not brittle.

EXAMPLE IV

This example illustrates the cured binder wherein a mixture of polyethers was employed as the polyol.

| Ingredients | Weight % |
| --- | --- |
| Nitrocellulose[1] | 23.0 |
| Nitroglycerin | 41.5 |
| Polyoxyethylene glycol[2] | 24.9 |
| PLURACOL PeP650[3] | 1.3 |
| Tolylene-2,4-diisocyanate | 8.1 |
| 2-Nitrodiphenylamine | 1.2 |
| Ferric acetylacetonate | 0.00004 |
| Nitrocellulose/polyol wt. ratio | 0.88 |
| NCO/OH (polyol) ratio | 2.3 |
| Curing Time (days) | 31 |

[1] 18–25 Centipoise viscosity, 11.4% Nitrogen (Hercules R.S.).
[2] Average mol weight 1500.
[3] Propylene oxide adduct of pentaerythritol, average mol wt. 600 (Wyandotte Chemicals Corporation).

The cured binder composition was a yellow colored, pliable, rubbery solid that was not brittle.

EXAMPLE V

This example illustrates a solid propellant prepared with the binder composition of Example I and its mechanical properties at three temperatures.

| Ingredients | Weight % | | |
| --- | --- | --- | --- |
| Binder composition (uncured) | 50.5 | | |
| Ammonium perchlorate | 36.0 | | |
| Aluminum | 13.0 | | |
| Magnesium oxide | 0.5 | | |
| Curing Time (days) | 11 | | |
| | Temperature | | |
| | −45°F. | 70°F. | 140°F. |
| Tensle strength, psi | 1000 | 224 | 220 |
| Elongation, % | 20 | 44 | 36 |
| Modulus of elasticity, psi | | 1067 | |
| Shore A hardness | | 85 | |
| Densitty, lb./cu.in. | | 0.0627 | |

EXAMPLE VI

This example illustrates a solid propellant prepared with the binder composition of Example II and its mechanical properties.

| Ingredients | Weight % |
| --- | --- |
| Binder composition (uncured) | 50.5 |
| Ammonium perchlorate | 36.0 |
| Aluminum | 13.0 |
| Magnesium oxide | 0.5 |
| Curing Time (days) | 11 |

| | Temperature 70°F. |
| --- | --- |
| Tensile strength, psi | 256 |
| Elongation, % | 50 |
| Density, lb./cu.in. | 0.063 |

EXAMPLE VII

This example illustrates a solid propellant prepared with the binder of Example III.

| Ingredients | Weight % |
| --- | --- |
| Binder composition (uncured) | 40.5 |
| Ammonium perchlorate | 44 |
| Aluminum | 15 |
| Magnesium oxide | 0.5 |
| Curing Time (days) | 13 |

The curred propellant composition was a yellow colored, pliable, rubbery solid that was not brittle and there was not any indication of formation of fines.

EXAMPLE VIII

This example illustrates a solid propellant prepared with the binder of Example IV.

| Ingredients | Weight % |
| --- | --- |
| Binder composition (uncured) | 60.5 |
| Ammonium perchlorate | 25.0 |
| Aluminum | 14.0 |
| Magnesium oxide | 0.5 |
| Curing Time (days) | 31 |

The cured propellant composition was a yellow colored, pliable, rubbery solid that was not brittle and there was not any indication of formation of fines.

EXAMPLE IX

This example illustrates the excellent stability of the propellant composition of this invention. A 0.5 gram portion of the cured propellant composition of Example V was heated at 150°C. in a partial vacuum for 1,000 minutes and no explosion occurred.

EXAMPLE X

This example illustrates the good impact sensitivity characteristics of the propellant composition of this invention. A sample of the propellant of Example V was subjected to initiation by a No. 8 blasting cap. The test was performed with the sample placed in a fiber tube on top of a cylindrical lead block. On functioning the cap the sample decomposed instantly but not explosively and without any deformation of the lead block.

EXAMPLE XI

This example illustrates the excellent ballistic properties of the propellant of this invention. Performance measurements on the propellant of Example V were obtained by using 8-in. × 40-in. static test motors, each containing about 70 lbs. of propellant. The nozzles were underexpanded (6:1 expansion ratio) and the grain configuration was an internal burning modified cruciform type.

Performance Measurements on Propellant

| Chmaber Pressure Pc (psi) | Specific Impulse Isp (lbf-sec/lbm) | | Characteristic Exhaust Velocity C* (ft/sec) |
| --- | --- | --- | --- |
| | Measured | Theoretical[a] | Measured |
| 700 | 243.1 | 244.5 | 5009 |

[a]-Theoretical specific impulse calculated for 700 psi chamber pressure and expansion ratio of 6:1.

It should be apparent that the objects of this invention have been attained. A new and improved solid propellant binder composition has been invented which provides new solid propellant compositions having outstanding physical and ballistic properties. The new compositions are, therefore, the basis for a new method of producing thrust. The new method of producing thrust, comprising burning the binder and propellant compositions of this invention in a rocket engine, are considered as an embodiment of this invention.

I claim:

1. A solid polyurethane propellant binder composition which comprises a polyurethane composition comprising the reaction product of nitrocellulose plasticized with a plasticizer selected from the group consisting of nitroglycerin and triethyleneglycol dinitrate, an aromatic diisocyanate and a polyol having a molecular weight of about 500 to 3,000 selected from the group consisting of dicarboxylic acid-polyol-polyesters and polyoxyalkylene ethers, and mixtures thereof, wherein said plasticizer is present in the proportion of about 40 to 60 parts by weight per 100 parts by weight of binder composition, wherein said nitrocellulose contains about 11.0 to 13.0% nitrogen and is present in the proportion of about 0.7 to 1.0 part per part of said polyol, and wherein said diisocyanate is present in an amount to provide an NCO/OH ratio of said diisocyanate to said polyol of about 1.2/1 to 3.0/1.

2. A solid polyurethane propellant binder composition in accordance with claim 1 wherein said polyol is a dicarboxylic acid-polyol-polyester.

3. A solid polyurethane propellant binder composition in accordance with claim 1 wherein said polyol is a polyoxyalkylene ether.

4. A solid polyurethane propellant binder composition which comprises a nitrocellulose-polyester polyurethane composition comprising the reaction product of nitrocellulose plasticized with a plasticizer selected from the group consisting of nitroglycerin and triethyleneglycol dinitrate, an aromatic diisocyanate, and a polyglycol adipate polyester having a molecular weight of about 500 to 3,000, wherein said plasticizer is present in the proportion of about 40 to 60 parts by weight per 100 parts by weight of binder composition, wherein said nitrocellulose contains about 11.0 to 13.0% nitrogen and is present in the proportion of about 0.7 to 1.0 part per part of said polyester, and wherein said diisocyanate is present in an amount to provide an NCO/OH ratio of said diisocyanate to said polyester of about 1.2/1 to 3.0/1.

5. A solid polyurethane propellant binder composition in accordance with claim 4 wherein said polyglycol adipate polyester has a molecular weight of about 1700 to 2,000.

6. A solid polyurethane propellant binder composition in accordance with claim 4 wherein said nitrocellulose contains about 11.8 to 12.2% nitrogen.

7. A solid polyurethane propellant binder composition in accordance with claim 4 wherein said polyglycol adipate polyester is a polyethyleneglycol adipate having a molecular weight of about 1700 to 2,000, wherein said nitrocellulose contains about 11.8 to 12.2% nitrogen, wherein said plasticizer is nitroglycerin, and wherein said aromatic diisocyanate is 2,4-tolylene diisocyanate.

8. A solid propellant composition which comprises about 10 to 70 percent by weight of the total propellant composition of an inorganic oxidizing salt and about 30 to 90 percent by weight of the total propellant composition of a polyurethane binder composition comprising the reaction product of nitrocellulose plasticized with a plasticizer selected from the group consisting of nitroglycerin and triethyleneglycol dinitrate, and aromatic diisocyanate and a polyol having a molecular weight of about 500 to 3,000 selected from the group consisting of dicarboxylic acid-polyol-polyesters and polyoxyalkylene ethers and mixtures thereof wherein said plasticizer is present in the proportion of about 40 to 60 parts by weight per 100 parts by weight of binder composition, wherein said nitrocellulose contains about 11.0 to 13.0% nitrogen and is present in the proportion of about 0.7 to 1.0 part per part of said polyol and wherein said diisocyanate is present in an amount to provide an NCO/OH ratio of said diisocyanate to said polyol of about 1.2/1 to 3.0/1 and wherein said inorganic oxidizing salt is dispersed within said polyurethane binder.

9. A solid propellant composition which comprises about 15 to 60 percent by weight of the total propellant composition of an inorganic oxidizing salt, about 10 to 30 percent by weight of the total propellant composition of a powdered metal selected from the group consisting of aluminum, magnesium, titanium, zirconium, boron, alloys thereof and mixtures thereof, and about 20 to 65 percent by weight of the total propellant composition of a polyurethane binder composition comprising the reaction product of nitrocellulose plasticized with a plasticizer selected from the group consisting of nitroglycerin and triethyleneglycol dinitrate, an aromatic diisocyanate and a polyol having a molecular weight of about 500 to 3,000 selected from the group consisting of dicarboxylic acid-polyol-polyesters and polyoxyalkylene ethers and mixtures thereof wherein said plasticizer is present in the proportion of about 40 to 60 parts by weight per 100 parts by weight of binder composition, wherein said nitrocellulose contains about 11.0 to 13.0% nitrogen and is present in the proportion of about 0.7 to 1.0 part per part of said polyol and wherein said diisocyanate is present in an amount to provide an NCO/OH ratio of said diisocyanate to said polyol of about 1.2/1 to 3.0/1 and wherein said inorganic oxidizing salt and said powdered metal are dispersed within said polyurethane binder.

10. A solid propellant composition in accordance with claim 9 wherein said polyol is a dicarboxylic acid-polyol-polyester.

11. A solid propellant composition in accordance with claim 9 wherein said polyol is a polyoxyalkylene ether.

12. A solid propellant composition which comprises about 15 to 60 percent by weight of the total propellant composition of an inorganic oxidizing salt, about 10 to 30 percent by weight of the total propellant composition of a powdered metal selected from the group consisting of aluminum, magnesium, titanium, zirconium, boron, alloys thereof and mixtures thereof, and about 20 to 65 percent by weight of the total propellant composition of a nitrocellulose polyester polyurethane composition comprising the reaction product of nitrocellulose plasticized with a plasticizer selected from the group consisting of nitroglycerin and triethyleneglycol dinitrate, an aromatic diisocyanate, and a polyglycol adipate polyester having a molecular weight of about 500 to 3,000 wherein said plasticizer is present in the proportion of about 40 to 60 parts by weight per 100 parts by weight of binder composition, wherein said nitrocellulose contains about 11.0 to 13.0% nitrogen and is present in the proportion of about 0.7 to 1.0 part per part of said polyester and wherein said diisocyanate is present in an amount to provide an NCO/OH ratio of said diisocyanate to said polyester of about 1.2/1 to 3.0/1 and wherein said inorganic oxidizing salt and said powdered metal are dispersed within said polyurethane binder.

13. A solid propellant composition in accordance with claim 12 wherein said inorganic oxidizing salt is ammonium perchlorate and wherein said powdered metal is aluminum.

14. A solid propellant composition in accordance with claim 12 wherein said polyglycol adipate polyester has a molecular weight of about 1700 to 2,000.

15. A solid propellant composition in accordance with claim 12 wherein said nitrocellulose contains about 11.8 to 12.2% nitrogen.

16. A solid propellant composition in accordance with claim 12 wherein said inorganic oxidizing salt is ammonium perchlorate, wherein said powdered metal is aluminum, wherein said polyglycol adipate polyester has a molecular weight of about 1700 to 2,000, wherein said nitrocellulose contains about 11.8 to 12.2% nitrogen, wherein said plasticizer is nitroglycerin, and wherein said aromatic diisocyanate is 2,4-tolylene diisocyanate.

17. A method of developing thrust in solid propellant burning reaction motors which comprises burning within said reaction motor a solid polyurethane propellant binder composition in accordance with claim 1.

18. A method of developing thrust in solid propellant burning reaction motors which comprises burning within said reaction motor a solid propellant composition in accordance with claim 9.

19. A method of developing thrust in solid propellant burning reaction motors which comprises burning within said reaction motor a solid propellant composition in accordance with claim 16.

* * * * *